Oct. 13, 1925.

E. A. CONAWAY 1,557,030

SEAL LOCK

Filed Feb. 10, 1925    2 Sheets-Sheet 1

Inventor.
Ernest A. Conaway,
By William A. Smith, Jr.
Attorney.

Oct. 13, 1925.
E. A. CONAWAY
SEAL LOCK
Filed Feb. 10, 1925
1,557,030
2 Sheets-Sheet 2
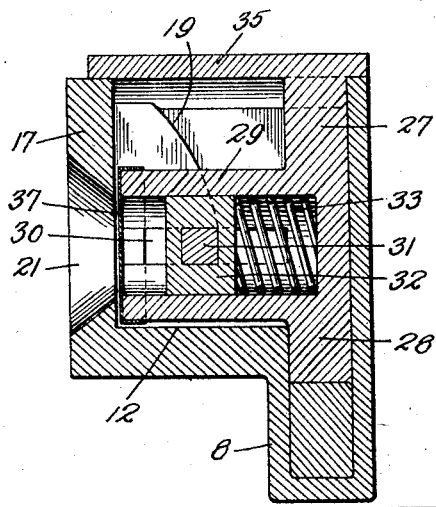
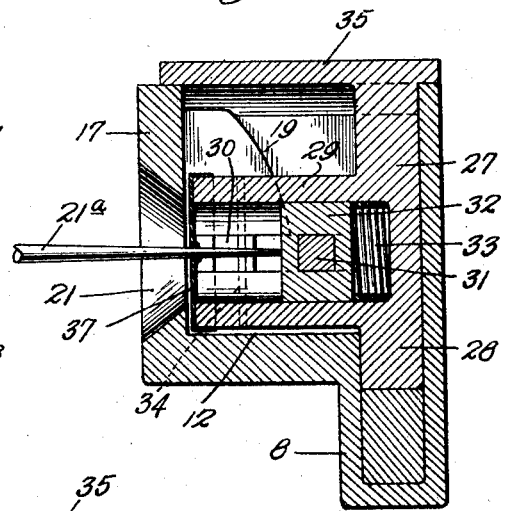
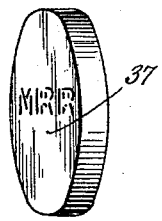
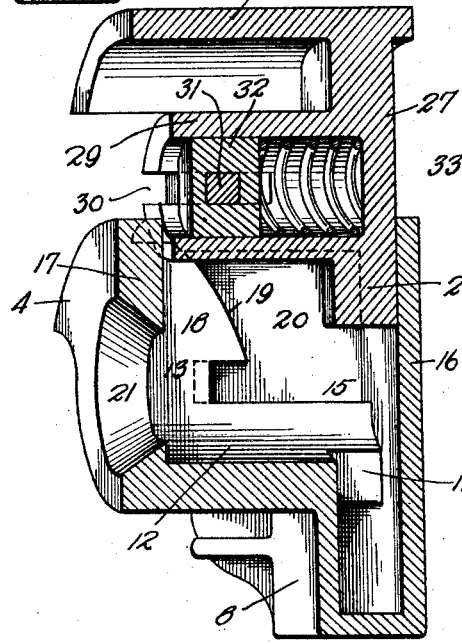
Inventor
Ernest A. Conaway,
By William A. Smith Jr.
Attorney Patented Oct. 13, 1925.

1,557,030

UNITED STATES PATENT OFFICE.

ERNEST A. CONAWAY, OF LITTLE ROCK, ARKANSAS.

SEAL LOCK.

Application filed February 10, 1925. Serial No. 8,206.

*To all whom it may concern:*

Be it known that I, ERNEST A. CONAWAY, a citizen of the United States, residing at Little Rock, in the county of Pulaski and State of Arkansas, have invented certain new and useful Improvements in Seal Locks, of which the following is a specification, reference being had therein to the accompanying drawing.

This invention relates generally to locking devices for doors and similar closures, but more particularly to seal locks adapted for use in connection with the sliding doors of railway freight cars and the like.

The invention has for its object the provision of a seal lock wherein two securing elements are provided and which are arranged in a manner such that either may be rendered inoperative without affecting the utility of the other.

A further object of the invention is to provide a seal lock comprising a dominant and a servient securing element adapted to cooperate with a common keeper and either of which may be used independently of the other, the dominant securing element, however, being provided with means which, when both elements are used simultaneously, engages the servient element within the keeper whereby to preclude the possibility of releasing the servient securing element before the dominant element is released.

A further object of the invention is to provide a seal lock of the type described wherein means is provided to seal the dominant securing element within the keeper in a manner such that any attempt to "pick" the lock or otherwise tamper with the securing device will be readily perceptible from a casual inspection thereof.

A further object of the invention is to provide a seal lock of heavy and rugged construction, yet which will be sufficiently flexible to adapt it for use on railway rolling stock where, due to the rocking and swaying of the cars in transit and the resulting tendency of the doors and jambs to become skewed out of proper alignment, a substantial range of play must be provided within which the separable parts of the lock may be operatively engaged.

A further object of the invention is to provide a lock of this type which may be effectively sealed without the use of a die or other special tools, and which, when sealed, cannot be opened without rupturing or puncturing the seal in a manner such that the mutilation thereof is plainly visible.

These and other objects will become apparent from the following description taken in connection with the accompanying drawings, in which:

Figure 4 is an enlarged vertical sectional view taken on the line 4—4 of Figure 3.

Figure 5 is a view similar to Figure 4, showing the manner of unlocking the device.

Figure 6 is a perspective view, partly in section, showing the bolt about to enter the keeper.

Figure 7 is a perspective view of the seal.

Figure 1:
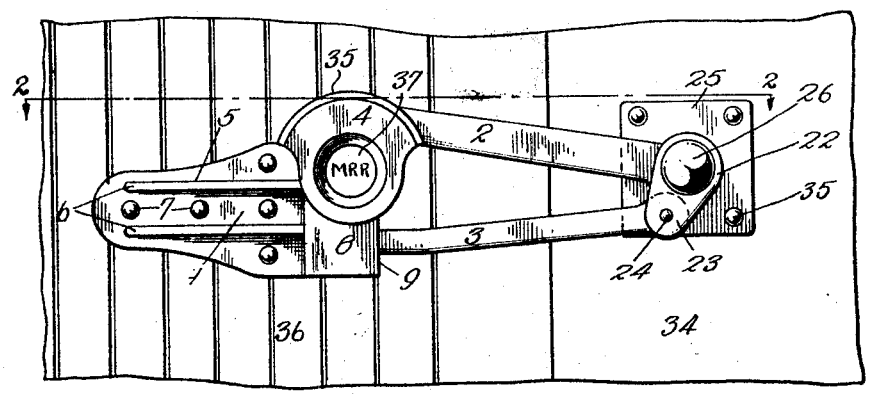
Figure 1 is a fragmental elevation of a car door and jamb with the invention applied thereto.

Referring more particularly to the accompanying drawings, in which like reference numerals are used to designate like parts throughout, the lock is shown as comprising a keeper 1 and a plurality of securing elements 2 and 3. The keeper, as best illustrated in Figures 1 and 6, comprises a cylinder or barrel 4 made integral with or otherwise secured to a base plate 5. The cylinder and base plate may be made of iron, steel, or any other suitable material, and may be cast, forged or machined as desired. The base plate is shown provided with suitable strengthening webs 6 extending longitudinally thereof and connecting to the body of the cylinder 4. Apertures are provided in the base plate 5 for the purpose of securing the plate to a support by means of suitable bolts such as shown at 7.

Figure 3:
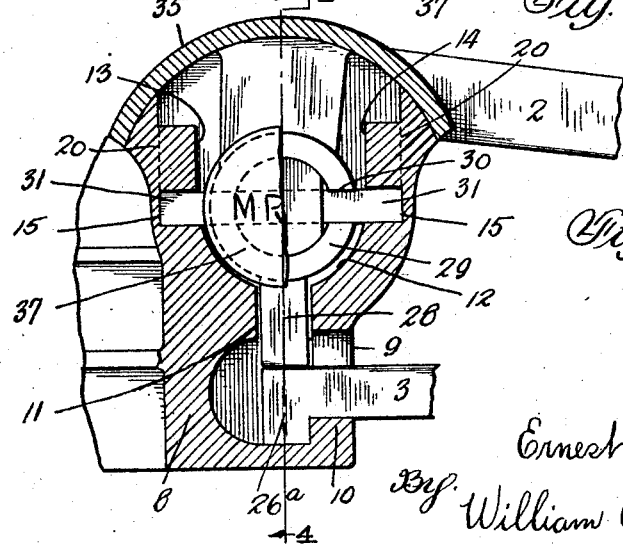
Figure 3 is a detail view, partly in section, showing the relative position of the securing elements within the keeper.

The base plate 5 is provided at one end with a hollow boss 8 having an open vertical side wall 9. As shown in Figure 3, the opening 9 does not extend completely to the bottom wall of the boss 8, but terminates short thereof so as to provide an integral lip 10 of substantial thickness which serves as a keeper bar for the bolt member 3. The boss 8 is further provided with an aperture 11 which provides a communicating channel between the interior of the cylinder 4 and the interior of the hollow boss 8.

The cylinder 4 is made hollow, as clearly shown in Figure 6, and the upper portion of the outer wall is cut away to permit the insertion and withdrawl of the bolt member 2. The interior wall of the cylinder 4 is formed either at the time of casting the piece or by machine processes later, with an arcuate bottom 12 into which the channel 11, communicating with the hollow boss 8, opens as shown most clearly in Figures 3 and 6. The arcuate bottom 12 of the cylinder merges into substantially straight vertical side walls 13 and 14 which are cut away as at 20 to form shoulders 15 extending from the rear wall 16 of the cylinder parallel to the axis thereof to a point adjacent to but short of the front wall 17 of the cylinder. Two of the shoulders 15 are provided, one on either side of the axis of the cylinder and slightly below the same.

Immediately above each of the shoulders 15 and in the planes of the walls 13 and 14, respectively, a lug 18 is formed which overhangs the forward portions of the shoulders a substantial amount, as clearly shown in Figure 6. The lugs 18 are provided with upper arcuate cam surfaces 19 which serve to connect the inner vertical side walls 13 and 14 with the cut out portions 20 thereof, and in reality form continuations of the shoulders 15 which they overhang and with which they are adapted to functionally cooperate in a manner to be hereinafter described. The forward wall 17 of the cylinder is provided with an axially positioned aperture 21 which provides means for the insertion of an operating tool 21ª, as shown in Figure 5, for the purpose of manipulating a latch member carried by the bolt 2.

The bolt members 2 and 3 hereinbefore referred to are generally of the pivoted hooked-end type and may be cast, forged or machined from any suitable material as desired. The main or dominant bolt 2 is provided at its pivot end with an enlarged boss 22 which carries a pair of trunnion plates 23. If desired, the trunnion plates may be cast integral with the boss and bolt as shown in Figure 1, and are adapted to pivotally support the auxiliary or servient bolt 3 beneath and in the plane of the dominant bolt 2. To this end a pivot pin 24 is provided in the trunnions 23 by which the servient bolt 3 is pivotally attached to the dominant bolt 2, which latter bolt is pivotally mounted upon a base plate 25 by means of a suitable pin or bolt 26. The bolt 2 is preferably thickened or reenforced adjacent to its pivot point whereby to materially strengthen the same and provide a larger bearing surface for said pivot. The servient or auxiliary bolt 3 is provided with a down-turned or hooked-end 26ª which, as shown in Figures 1 and 3, is adapted to enter the opening 9 in the side wall of the boss 8 and cooperate with the lip or keeper bar 10 therein provided.

The dominant or main bolt 2 is formed with a down-turned end 27 terminating in a centrally positioned and depending lug 28. The down-turned end 27 of the bolt is formed intermediate the bolt end and the lug 28 with an open-ended hollow stud or housing 29, the axis of which is substantially perpendicular to the plane of the bolt and parallel to the pivotal axis thereof. The wall of the stud or housing 29 is longitudinally slotted as at 30, said slots extending from the outer or projecting free end of the stud, at diametrically opposite points, inwardly towards the plane of the bolt to a point adjacent thereto but short thereof. The slots in the wall of the stud 29 are for the purpose of guiding and confining a pair of pins 31 carried by and projecting radially from a block or plunger 32 housed within the hollow stud and adapted to reciprocate therein. The block 32 is urged into an extreme outward position by means of a coil spring 33 housed within the stud behind the block, said block being retained within the housing and limited in its forward movement by a pair of transverse pins 34 inserted in the wall of the housing so as to bridge the slots 30 at points adjacent to their forward end. It is apparent from this construction, which is clearly shown in Figure 6, that the pins 31, projecting radially from the block 32 through the slots 30, will engage the pins 34 bridging said slots which thus determine the range of reciprocation of the block within the stud or housing. It is to be noted that the radially projecting pins 31 extend beyond the outer wall of the stud a substantial distance, and the purpose of this construction will presently be made apparent.

The outer or free end of the dominant or main bolt 2 is further provided with a shield or guard 35 preferably constituting a portion of the wall of a cylinder of substantially the same diameter as the cylinder 4, and extending forwardly of the plane of the bolt 2 a distance corresponding to the depth of the cylinder 4, and extending rearwardly of the plane of the bolt a distance corresponding to the thickness of the rear wall of said cylinder.

Figure 2:
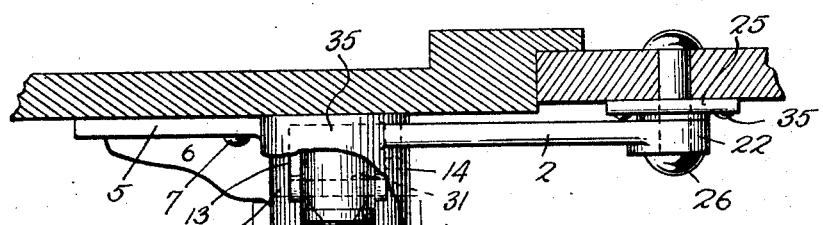
Figure 2 is a sectional view taken on the line 2—2 of Figure 1, with a part of the lock casing broken away.

In the application of the invention to the sliding door of an ordinary railway freight car, the base plate 25 carrying the bolts 2 and 3 is secured to the sliding door by means of a plurality of screws or bolts 35. As shown in Figures 1 and 2, the pivot pin 26 of the bolt 2 is preferably extended through the plate 25 and door 34 and made secure on the inside of the door. By this construction the bolts 2 and 3 are securely fastened to the door and can be removed therefrom only from the inside of the car door. The double keeper 1 is mounted on the jamb of the door 36 by suitable screws or bolts 7 and in a position such that when the door 34 is closed the bolts 2 and 3 may be operatively associated therewith.

Assuming the invention to have been mounted as just described, the door is locked by first guiding the auxiliary or servient bolt 3 into the opening 9 of the boss 8 as the door 34 is being moved to its closed position. The spacing of the bolts and keeper is such that when the door 34 is completely closed the hooked end 26 of the bolt 3 will drop into the recess of the hollow boss 8 behind the keeper bar 10 thereof. The main or dominant bolt 2 is then brought into the position shown in Figure 6 by swinging the same about its pivot pin 26 so that it may enter the hollow cylinder 4 from above. Upon entering the bolt into said cylinder the projecting pins 31, carried by the reciprocable block 32, engage the cam surfaces 19 of the lugs 18 and, due to the camming action taking place between the lugs and the pins, the resistance of the spring 33 is overcome and the block 32 is forced or retracted within the stud 29, thus allowing the bolt 2 to move within the hollow cylinder 4. When the pins 31 reach the end of the cam surfaces 19 of the lugs 18, the bolt 2 drops completely within the cylinder 4, the pins 31 engaging the shoulders 15 and being in this position clear of the cam plugs 18, the spring 33 comes into play and forces the block 32 forwardly, thus bringing the pins 31 beneath the overhanging portions of the lugs 18. The depending lug 28, carried at the extremity of the downturned end 27 of the bolt 2, enters the channel 11 in the bottom wall of the cylinder and rests against the hooked end of the bolt 3. It is to be noted that the shoulders 15 within the cylinder 4 are so positioned as to bring the stud 29 into axial alignment with the cylinder 4, the open end of said stud registering with the opening 21 in the front wall of the cylinder. It will thus be seen that the auxiliary bolt 3 can only be released by first releasing the dominant or main bolt 2, and that the latter can only be released by retracting the bolt 32 sufficiently to allow the pins 31 to clear the overhanging portions of the lugs 18 which may be accomplished by introducing a suitable instrument into the keeper through the opening 21 thereof, as clearly shown in Figure 5.

In order to prevent an unauthorized opening of the lock or to prevent its being opened and relocked without visible evidence thereof, a seal 37 is provided in the form of a sheet metal cup-shape disc which, as shown in Figure 7, may be embossed or otherwise provided with the name or initials of the railroad company. This seal, prior to the closing or locking of the dominant bolt 2, is fitted over the forward open end of the stud or housing 29, it being apparent that sufficient clearance is provided between the end of the stud 29 and the inner face of the front wall 17 of the cylinder to permit the bolt 2 to be then snapped into place as above described. When the bolt 2 is in its locked position and firmly seated within the keeper 1, the shield or guard 35 carried by said bolt functions to completely close the upper part of the keeper, as clearly shown in Figure 1. It is therefore apparent that the cylinder 4, the guard 35, and the seal disc 37 completely enclose the locking mechanism of the bolt 2, which bolt must, from the construction of the device, be released before either the bolt 3 or the door of the car may be opened. The bolts, keeper, cylinder and guard being of heavy and rugged construction, and the lock mechanism being completely enclosed thereby, the only means of opening the lock without entirely destroying the same is by way of the opening 21 in the front wall of the cylinder, and this, as hereinbefore set forth, is obstructed by the seal 37.

In view of this fact the front face of the cylinder immediately surrounding the opening 21 is bevelled as at 21$^b$ so that the seal disc, which is preferably made of bright sheet metal of non-rustable character, will be plainly visible and in striking contrast to the dark cast or forged metal of the lock cylinder. By this construction the least mark or evidence of tampering with the lock is plainly visible, thus rendering a minute or careful examination unnecessary to discover an unauthorized attempt to open the car.

As hereinbefore stated, the bolt, having been snapped into position within the keeper with a seal disc mounted upon the outer end of the stud 29, the only means of opening the lock is by way of the opening 21 and the disc 37. To this end the disc is made of tough but relatively thin penetrable sheet metal and the members of the train crew and other persons authorized to open the cars are provided with sharp pointed instruments, such as shown in Figure 5, whereby the metal of the disc may be punctured, the block 32 depressed or retracted sufficiently to move the pins 31 clear of the lugs 18 and the lock then opened in a manner obvious from the previous description. If desired, the usual switch keys carried by the train crew may be provided with a sharpened extremity, or any other suitable instrument capable of being used for this purpose, may be used if desired.

From the foregoing description it is apparent that the bolts having been snapped into place and sealed, either of the bolts may be broken between the keeper and their pivot pins without releasing the other or allowing the door to be opened. Furthermore, while the bolt 3 is merely a pivoted hooked end bolt with no means of itself to perform a locking function, the bolt 2 and the keeper common to both bolts are so formed that when the bolts are in position within the keeper, the lug 28 carried by the bolt 2 engages the hooked end of the bolt 3, thus rendering the release of the latter impossible until the dominant bolt is released; yet the construction employed is such that either of the bolts may be used separately and independently of the other if desired. It is also to be noted that by providing the cylinder with an arcuate bottom, and the bolt 2 with a cylindrical stud or housing 29 adapted to cooperate with the arcuate bottom, means is provided which allows a wide range of relative movement of the car parts with which the lock is associated, without interfering with the operation of the same.

The invention having thus been described and illustrated in the accompanying drawings, it is to be noted that such description and illustration is for the purpose of setting forth a preferred embodiment of the invention and not as defining the limits thereof, which are to be determined by the scope of the appended claims,

Having thus described my invention what I claim as new is:

1. A device of the character described comprising a keeper provided with a plurality of bolt receiving apertures, bolts adapted to engage said apertures in superposed relation, and latch mechanism carried by one of said bolts and adapted to lockingly engage the keeper whereby to lock both bolts within the keeper.

2. In a seal lock, the combination of a keeper, a plurality of bolts adapted for position within said keeper, means carried by one of the bolts to lock the same within the keeper whereby to prevent the release of the bolts, and a seal normally preventing access to said locking means.

3. A device of the character described comprising a dominant bolt, a servient bolt, a keeper for the bolts, and means carried by the dominant bolt and adapted to engage the servient bolt when the bolts are in position within the keeper, for preventing the release of the servient bolt prior to the release of the dominant bolt.

4. A device of the character described comprising a keeper provided with a plurality of bolt receiving compartments, swinging bolts adapted to engage the compartments of the keeper in superposed relation, means carried by the upper bolt and adapted to engage the lower bolt to prevent release of the latter, and means carried by the upper bolt to lock the same within the keeper.

5. A device of the character described comprising a plurality of bolts, a keeper for the bolts, and means carried by one of said bolts to lockingly engage the keeper whereby to prevent the release of either bolt.

6. A device of the character described comprising a bolt, a keeper for the bolt, a housing carried by the bolt, latch mechanism mounted therein and reciprocable in a line perpendicular to the plane of the bolt, and means within the keeper cooperating with the latch mechanism to releasably maintain the bolt within the keeper.

7. A device of the character described comprising a bolt; a hollow stud carried by the bolt; a reciprocable block mounted within the stud; pins carried by the block and extending through the walls of the stud; a keeper for the bolt; cam lugs positioned within the keeper and adapted to be engaged by the pins of the block as the bolt enters the keeper, whereby to retract the block within the stud; and means within the stud to move the block and pins beneath the lugs when the bolt is seated within the keeper.

8. A device of the character described comprising a swinging bolt, a keeper provided with a chamber having an open top wall, locking mechanism carried by the bolt and adapted to engage the interior of said chamber to lock the bolt therein, and a guard plate carried by the bolt in the rear of said lock mechanism whereby to close the top wall of the chamber to prevent tampering with the lock.

9. A seal lock comprising a bolt, a latch mechanism carried thereby, a keeper for the bolt having a bolt-receiving opening and a latch-operating opening therein, a guard and a seal carried by the bolt, said guard and seal designed to close the bolt-receiving opening and the latch-operating opening respectively when the bolt is seated within the keeper.

10. A device of the character described comprising a dominant bolt, a latch mechanism carried thereby, a servient bolt, a keeper for the bolts, means within the keeper to retain the dominant bolt therein, and means carried by the dominant bolt to engage the servient bolt to prevent the release of the servient bolt prior to the release of the dominant bolt.

11. A seal lock comprising a pivoted bolt; a latch mechanism carried by the bolt and including an open-ended cylindrical housing having slotted side walls; a plunger reciprocable within the housing; pins carried by the plunger and projecting through the slotted wall thereof; a keeper for the bolt having a latch-operating opening therein; cam lugs within the keeper for engagement by the pins as the bolt enters the keeper whereby to retract the plunger within the housing; means within the housing to move the plunger and pins beneath the cam lugs when the bolt is seated, and a seal closing the open end of the housing whereby to normally prevent access to the latch mechanism.

12. A seal lock comprising a dominant bolt, a latch mechanism carried thereby and including an open-ended cylindrical housing carried at the free end of the bolt, and having slotted side walls; a plunger mounted for reciprocation within the housing; pins carried by the plunger and projecting through the slotted walls of the housing; a servient bolt; a keeper for the bolts, having a latch-operating opening; means to position the dominant bolt within the keeper whereby the open end of the housing registers with the keeper opening; cam lugs within the keeper adapted to be engaged by the pins to retract the plunger when the dominant bolt is entered in the keeper; a spring within the housing adapted to urge the plunger and pins beneath the cam lugs when the dominant bolt engages the positioning means; a lug carried by the dominant bolt for engaging the servient bolt within the keeper to prevent the release of the servient bolt prior to that of the dominant bolt, and a penetrable seal carried by the housing of the dominant bolt and closing the open end thereof, whereby to normally prevent access to the latch mechanism.

In testimony whereof I hereunto affix my signature.

ERNEST A. CONAWAY.